(12) United States Patent
Huard (10) Patent No.: US 8,587,268 B1
(45) Date of Patent: Nov. 19, 2013

(54) SYSTEM AND METHOD FOR PROVIDING AN ACTIVE CURRENT ASSIST WITH ANALOG BYPASS FOR A SWITCHER CIRCUIT

(75) Inventor: Jeffry Mark Huard, Puyallup, WA (US)

(73) Assignee: National Semiconductor Corporation, Santa Clara, CA (US)

( * ) Notice: Subject to any disclaimer, the term of this patent is extended or adjusted under 35 U.S.C. 154(b) by 1109 days.

(21) Appl. No.: 12/214,280

(22) Filed: Jun. 18, 2008

(51) Int. Cl.
*G05F 1/56* (2006.01)
*G05F 1/565* (2006.01)
*G05F 1/575* (2006.01)

(52) U.S. Cl.
USPC ............................ 323/268; 323/283; 323/284

(58) Field of Classification Search
USPC .......................................... 323/268, 271–284
See application file for complete search history.

(56) References Cited

U.S. PATENT DOCUMENTS

| | | | |
|---|---|---|---|
| 6,188,212 B1 * | 2/2001 | Larson et al. | 323/281 |
| 6,377,784 B2 | 4/2002 | McCune | |
| 6,757,526 B1 * | 6/2004 | Sharp et al. | 455/127.1 |
| 6,900,697 B1 | 5/2005 | Doyle et al. | |
| 6,914,487 B1 | 7/2005 | Doyle et al. | |
| 7,058,373 B2 | 6/2006 | Grigore | |
| 7,132,891 B1 | 11/2006 | Dening et al. | |
| 7,190,150 B2 | 3/2007 | Chen et al. | |
| 7,330,070 B2 | 2/2008 | Vaisanen | |
| 7,342,387 B1 | 3/2008 | Li | |
| 7,538,631 B2 | 5/2009 | Immonen et al. | |
| 7,653,366 B2 | 1/2010 | Grigore | |
| 2008/0030178 A1 | 2/2008 | Leonard et al. | |
| 2008/0055943 A1 * | 3/2008 | Komiya | 363/21.03 |
| 2008/0247199 A1 * | 10/2008 | Djenguerian et al. | 363/50 |
| 2008/0259656 A1 * | 10/2008 | Grant | 363/21.18 |
| 2010/0233977 A1 | 9/2010 | Minnis et al. | |

OTHER PUBLICATIONS

Yushan Li, "System and Method for Controlling a Regulator Circuit for Radio Frequency Power Amplifier Biases", U.S. Appl. No. 11/818,752, filed Jun. 15, 2007.
Yushan Li, "Power Amplifier Multiple Stage Control for Polar Modulation Circuit", U.S. Appl. No. 12/152,227, filed May 13, 2008.
Yushan Li, et al., "System and Method for Suppressing Load Transients in Radio Frequency Power Amplifier Switching Power Supplies", U.S. Appl. No. 12/008,843, filed Jan. 15, 2008.

(Continued)

*Primary Examiner* — Adolf Berhane
*Assistant Examiner* — Nusrat Quddus
(74) *Attorney, Agent, or Firm* — Andrew S. Viger; Wade J. Brady, III; Frederick J. Telecky, Jr.

(57) ABSTRACT

A system and method are disclosed for providing an active current assist with analog bypass for a switcher circuit. An active current assist circuit is coupled to a buck regulator circuit, which includes a switcher circuit, an inductor circuit and a capacitor circuit. The active current assist circuit includes an active current analog bypass control circuit and a current source. The active current analog bypass control circuit receives and uses current limit information, voltage error information, and drop out information to determine a value of assist current that is appropriate for a current operational state of the buck regulator circuit. The active current analog bypass control circuit causes the current source to provide the appropriate value of assist current to the buck regulator circuit.

28 Claims, 3 Drawing Sheets

(56) References Cited

OTHER PUBLICATIONS

Yushan Li, "Circuit and Method for RF Power Amplifier Power Regulation and Modulation Envelope Tracking", U.S. Appl. No. 11/701,747, filed Feb. 2, 2007.

Jeffry M. Huard, "Method and System for Adding Boost Functionality to a Buck Switcher With Minimal Cost", U.S. Appl. No. 12/221,522, filed Aug. 4, 2008.

"1.5MHz Monolithic Synchronous Step-Down Regulator Brings High Efficiency to WCDMA Cellular Telephone Applications", Design Ideas, Linear Technology Magazine, Feb. 2004, p. 32-35.

"1.5MHz, 600mA Synchronous Step-Down Regulator with Bypass Transistor", Linear Technology, 2003, 16 pages.

"600mA/650mA PWM Step-Down Converters in 2mm × 2mm WLP for WCDMA PA Power", Maxim Integrated Products, Feb. 2010, 24 pages.

* cited by examiner

SYSTEM AND METHOD FOR PROVIDING AN ACTIVE CURRENT ASSIST WITH ANALOG BYPASS FOR A SWITCHER CIRCUIT

TECHNICAL FIELD OF THE INVENTION

The present invention is generally directed to the manufacture of semiconductor circuits and, in particular, to a system and method for providing an active current assist with analog bypass for a switcher circuit.

BACKGROUND OF THE INVENTION

The digital telephone service known as Global System for Mobile Communication is usually referred to by the initials GSM. It is well known that GSM power amplifier (PA) devices generally require very large currents and have very demanding switching times. For this reason there are no switcher circuits that are presently able to adequately handle supplying the GSM PA power supply requirements. When one tries to design a circuit to drive a large current, for example, in a GSM cell phone, one finds that the inductor circuits that are currently available are not up to the task. The inductor circuits that are currently available are either physically too big, or are too low in inductance, or cannot handle the necessary current.

The current state of the art is to use a low drop out (LDO) regulator or a linear device to handle the GSM parameter requirements. However, when the low drop out (LDO) regulator or linear device is not transmitting at maximum power, the low drop out (LDO) regulator or linear device wastes a lot of power.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4 and the various embodiments used to describe the principles of the present invention in this patent document are by way of illustration only and should not be construed in any way to limit the scope of the invention. Those skilled in the art will understand that the principles of the present invention may be implemented in any type of suitably arranged integrated circuit switcher device.

To simplify the drawings, the reference numerals from previous drawings will sometimes not be repeated for structures that have already been identified.

The system and method of the present invention is designed to get around the present limitations of inductor circuits. The present invention does this in two ways. The first way is that it extends the dynamic range of the switcher beyond what the inductor is normally capable of handling by itself. It also employs an analog bypass (instead of a digital bypass) to get around the problem of switcher drop out resistance. The inductor's DC resistance (DCR) in a buck regulator circuit provides a significant portion of the drop out resistance. Both of these features are implemented using the same "Pull Up DAC" circuit.

Prior art digital bypass modes have been employed but digital bypass modes are more limiting for the customer because the operation of a digital bypass mode is either on or off. There is nothing in between. The prior art approach creates a step function on the output voltage when engaging or disengaging. This can create problems for some applications. The prior art approach does not extend the dynamic regulation range of the switcher. Nor does it effectively improve the switcher dropout performance.

The present invention provides an analog bypass mode that provides an assist current to the buck regulator circuit. This keeps the buck regulator circuit in full regulation all the way to the drop out point of the bypass circuit. A normal buck regulator circuit will drop out much earlier because it is limited by its parasitic resistances (RDSON of the switches and the inductor's parasitic resistance) and whatever duty cycle limitations it has.

The present invention provides an appropriate assist current to the buck regulator circuit to extend the dynamic range of the switcher circuit in both positive and negative currents. So, for example, if one has a one and one half ampere (1.5 A) switcher, one can use the present invention to extend the operating range two and one half amperes (2.5 A). The analog bypass transistor of the present invention can be used not only during a bypass mode, but can also be used to assist in providing a driving current that is beyond the unaided capability of the inductor. This is beneficial for driving larger loads steady state or dynamically and for fast output voltage transitions.

When the active current assist circuit of the invention is connected to a buck regulator circuit, there are two parallel paths for the current. When the switcher circuit of the buck regulator circuit is in normal regulation mode, all of the current will be going through the inductor up until the inductor hits whatever current limit that the inductor is capable of. After that happens, there will be two parallel paths for the current. A first path will be through the inductor and a second path will be through the active current assist circuit of the present invention.

When the active current assist circuit of the present invention is operated in bypass mode, the current will transition from going through the inductor to going through the active current assist circuit (as dictated by which of the current paths presents the lowest resistance path). That is, in near or full bypass mode most of the current will be through the active current assist circuit because it presents the path of lowest resistance.

The active current assist circuit extends the operation of the switcher circuit in both positive and negative currents. All of the loop dynamics of the circuit are dominated by the switcher circuit. The active current assist circuit adds or subtracts current as necessary to try to keep the switcher circuit operating within its dynamic range so that the system efficiency is optimized (for example, at its peak inductor current for high current loads).

If the buck regulator circuit is only running at half of the inductor current, then all of the current is all going to go through the switcher circuit. But once the current increases to two times the inductor current, then half of the current will go through the switcher circuit and half of the current will go through the active current assist circuit.

The active current assist circuit of the present invention is ideally suited for buck regulator circuits that have dynamically changing output voltages. The active current assist circuit of the present invention can provide extra current to charge or discharge the output capacitor beyond what the buck switcher and inductor circuits alone can deliver.

Figure 1:
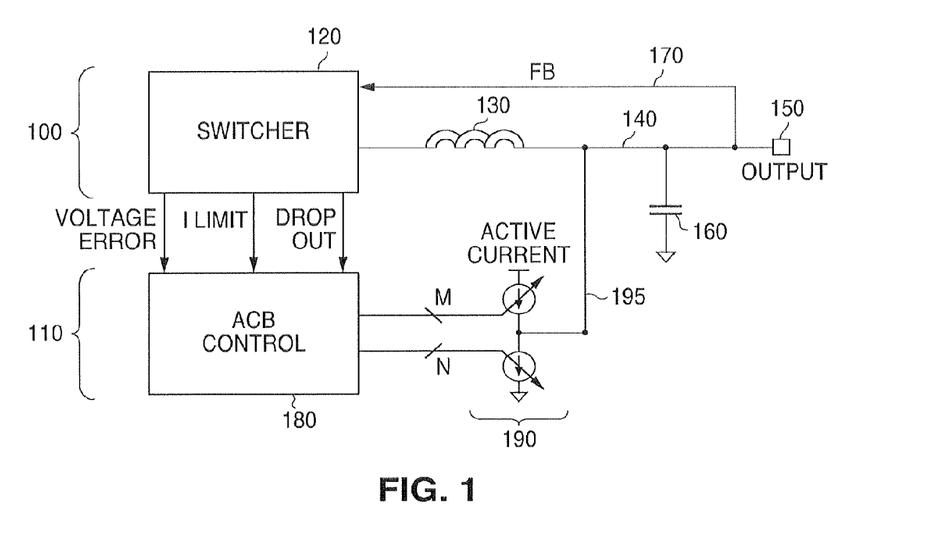
FIG. 1 illustrates a schematic diagram of a buck regulator circuit and an advantageous embodiment of an active current assist circuit of the present invention.

FIG. 1 illustrates a schematic diagram of a buck regulator circuit 100 and an advantageous embodiment of an active current assist circuit 110 of the present invention. The buck regulator circuit 100 comprises a switcher circuit 120 having an output that is connected to a first end of an inductor 130. The second end of the inductor 130 is connected to an output signal line 140 that is connected to an output node 150. A typical inductance of the inductor 130 is two and two tenths microHenries (2.2 µH).

A first end of an output capacitor 160 is connected to the output signal line 140 between the second end of the inductor 130 and the output node 150. A second end of the output capacitor 160 is connected to ground. A typical value of capacitance for the output capacitor is four and seven tenths microfarads (4.7 µF).

A first end of a feedback signal line 170 is connected to the output signal line 140 between the output capacitor 160 and the output node 150. A second end of the feedback signal line 170 is connected to the switcher circuit 120. The structure and operation of the buck regulator circuit 100 is well known in the art. Therefore, the structure and operation of the buck regulator circuit 100 will not be discussed in detail in this patent document.

The present invention comprises the active current assist circuit 110 that is connected to the buck regulator circuit 100 in the manner that is shown in FIG. 1. The active current assist circuit 110 comprises an active current assist analog bypass control circuit 180 (sometimes referred to as an ACB control circuit 180) and a current source 190 that is controlled by the ACB control circuit 180. As shown in FIG. 1, the ACB control circuit 180 receives signals from the switcher circuit 120 that contain information concerning the state of operation of the buck regulator circuit 100. In particular, the ACB control circuit 180 receives information concerning the state of operation of the inductor 130, and the switcher voltage error and whether the switcher is pulse skipping.

Based upon the information that the ACB control circuit 180 receives from switcher circuit 120, the ACB control circuit regulates the current that is output from the current source 190. As shown in FIG. 1, the output of the current source 190 is provided to a signal line 195 that is connected to the output signal line 140 of the buck regulator circuit 100. As will be more fully described, the ACB control circuit 180 causes the current source 190 to either (1) provide current to the output signal line 140, or (2) remove current from the output signal line 140, or (3) provide no current to the output signal line 140.

As shown in FIG. 1, the switcher circuit 120 provides voltage error information to the ACB control circuit 180. The voltage error information is indicated by the arrow from the switcher circuit 120 to the ACB control circuit 180 that is designated "Voltage Error." The switcher circuit 120 also provides current limit information to the ACB control circuit 180. The current limit information is indicated by the arrow from the switcher circuit 120 to the ACB control circuit 180 that is designated "I Limit." The switcher circuit 120 also provides drop out information to the ACB control circuit 180. The drop out information is indicated by the arrow from the switcher circuit 120 to the ACB control circuit 180 that is designated "Drop Out." These three types of information will be more fully described below.

Figure 2:
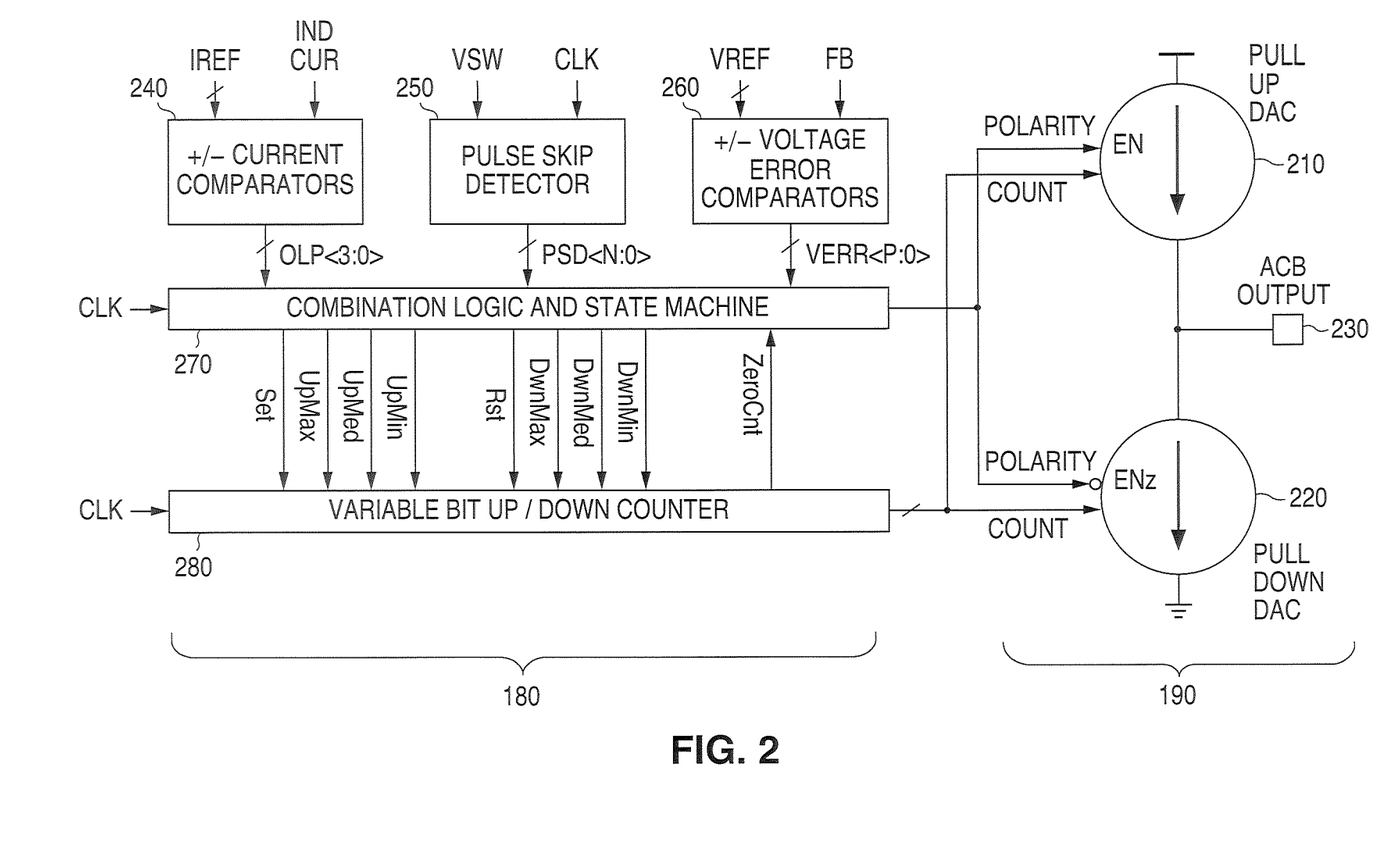
FIG. 2 illustrates a schematic diagram showing an advantageous embodiment of an active current assist analog bypass control circuit of the present invention.

FIG. 2 illustrates a schematic diagram showing an advantageous embodiment of an active current assist analog bypass control circuit 110 of the present invention. The current source 190 comprises a positive current source 210 and a negative current source 220. The positive current source 210 comprises a pull up digital to analog converter (DAC) 210. The negative current source 220 comprises a pull down digital to analog converter (DAC) 220. The first end of the pull up DAC 210 is connected to a power supply and the second end of the pull up DAC 210 is connected to an ACB output node 230. The first end of the pull down DAC 220 is connected to the ACB output node 230 and the second end of the pull down DAC 220 is connected to ground. The ACB output node 230 is connected to the signal line 195 (not shown in FIG. 2).

The pull up DAC 210 and the pull down DAC 220 can not both be in operation at the same time. To ensure this result a common polarity pin is provided to the pull up DAC 210 and to the pull down DAC 220. An inverter circuit is provided on the polarity signal input line of the pull down DAC 220. The inverter circuit is represented as a bubble on the polarity input of the pull down DAC 220 in FIG. 2. When a positive polarity signal EN enables the operation of the pull up DAC 210 then the operation of the pull down DAC 220 will be disabled because the inverter circuit will create a negative polarity signal ENz for the pull down DAC 220. Similarly, when a negative polarity signal ENz enables the operation of the pull down DAC 220 then the operation of the pull up DAC 210 will be disabled because negative polarity signal ENz will not enable the pull up DAC 210.

As will be more fully described below, a counter of the ACB control circuit 180 is capable of providing a digital code (e.g., a seven bit code) to the pull up DAC 210 to cause the pull up DAC to provide a particular level of current through the ACB output node 230 to the buck regulator circuit 100. The counter in the ACB control circuit 180 is also capable of providing a similar digital code to the pull down DAC 220 to cause the pull down DAC 220 to sink a particular level of current from the buck regulator circuit 100 through the ACB output node 230 to ground.

The ACB control circuit 180 comprises a current comparator circuit 240, a pulse skip detector circuit 250, a voltage error comparator circuit 260, a combination logic and state machine 270, and a variable bit up/down counter 280. The operation of these elements will now be discussed.

The current comparator circuit 240 receives the inductor current information from the switcher circuit 120. The current information comprises a current (designated IndCur in FIG. 2) that is proportional to the current through the inductor 130. The IndCur current is a significantly scaled down version of the inductor current. Depending upon the design parameters of the application, the IndCur current may be, for example, one thousandth ($10^{-3}$) of the inductor current or one ten thousandth ($10^{-4}$) of the inductor current. The IndCur current gives the ACB control circuit 180 real time information concerning the value of the inductor current.

A second portion of the current information comprises a series of positive and negative reference currents (designated IREF in FIG. 2) that are to be compared to the IndCur representation of the inductor current. The current comparators circuit 240 makes the comparisons.

A first type of reference current is designated OLP for Over Load Protection. The value of the Over Load Protection reference current indicates when the inductor 130 is approaching saturation (i.e., the inductance value drops by thirty percent (30%)). The inductor will most likely overheat if operated at this point for an extended period of time. The approaching saturation of the inductor will initiate a positive step in ACB output current of the ACB circuit 180. The positive current source will only turn on after the negative current source has decremented to zero amperes (0 A).

A second type of reference current is designated NCP for Negative Current Protection. The Negative Current Protection reference current indicates that the switcher circuit 120 is approaching a limit of safe operation for negative current. An NCP signal will initiate a negative step in ACB output current. The negative current source will only turn on after the positive current source has decremented to zero amperes (0 A).

A third type of reference current is designated IRMS. The IRMS current indicates a reliable steady state Root Mean Square (RMS) current limit of the inductor 130. The value of the IRMS current is often well below the saturation level of the inductor 130. For implementation simplicity, rather than detect an RMS current directly, a close approximation would be to set the threshold of the peak current comparator to the IRMS value. This will trip when the inductor current is at or below the IRMS value depending on how much inductor ripple current is present. Inductor currents higher than IRMS will initiate a positive step in the ACB output current.

A fourth type of reference current is designated IDeadBand. The term "Dead Band" refers to a level of operation of the switcher circuit 120 in which the ACB control circuit 180 takes no action (i.e., does not change the value of the "assist" current from current source 190). In general, when the current level of the switcher circuit 120 is above a certain current level, the ACB control circuit 180 is going to make a positive step in the ACB output current. Similarly, when the current level of the switcher circuit 120 is below a certain current level, the ACB control circuit 180 is going to make a negative step in the ACB output current. When the current level of the switcher circuit 120 is between these two levels then the ACB control circuit 180 takes no action as a result of the inductor current. This "no action" zone is referred to as the "Dead Band" zone. The use of the "Dead Band" zone prevents the ACB control circuit 180 from continuously adjusting the level of the "assist" current from the current source 190. The range of the "Dead Band" zone is a parameter that may be selected depending upon a particular application. A typical range of values for the "Dead Band" zone may encompass one fifty hundred milliamperes (150 mA). For example, the "Dead Band" range could start from the IRMS level to the IRMS level minus one hundred fifty milliamperes (150 mA).

The IDeadBand reference current is a current that is slightly lower than the IRMS reference current with a sufficient "Dead Band" range to avoid continuously adjusting the level of the "assist" current. When the value of the IndCur current is between the value of the IRMS current and the value of the IDeadBand current, then the ACB control circuit 180 will take no action (unless the ACB control circuit 180 is in bypass mode).

The Over Load Protection reference current is provided to the current comparator circuit 240 in three separate digital signals. The first OLP digital signal is designated OLP1. The OLP1 signal is high when the value of the inductor current is less than or equal to one and forty five hundredths ampere (1.45 A) minus the "Dead Band" current limit value. The second OLP digital signal is designated OLP2. The OLP2 signal is high when the value of the inductor current is greater than or equal to one and forty five hundredths ampere (1.45 A). The third OLP digital signal is designated OLP3. The OLP3 signal is high when the value of the inductor current is equal to one and nine tenths ampere (1.9 A).

The Negative Current Protection reference current is provided to the current comparator circuit 240 in one digital signal. The NCP digital signal is high when the inductor current is equal to a negative one ampere (−1 A).

The output of the current comparator circuit 240 is provided to the combination logic and state machine 270. As shown in FIG. 2, the output of the current comparator circuit 240 is provided in an M+1 bit digital word that is referred to as OLP<M:0>. The M+1 bit digital word OLP<M:0> provides the current limit information (I Limit) shown in FIG. 1 where OLP<0>=NCP, OLP<1>=OLP1, OLP<2>=OLP2 and OLP<3>=OLP3.

The current levels described above are provided as examples. The actual current levels will depend on a particular application and on the particular inductor chosen.

The pulse skip detector circuit 250 is a digital circuit that keeps track of how many pulses are being skipped by the buck regulator circuit 100. It is well known that buck regulators often have a maximum duty cycle of operation before they start pulse skipping so that they can regulate to higher voltages. This behavior is used by the pulse skip detector circuit 250 to determine when to transition the operation of the ACB control circuit 180 from an "Active Current assist" (AC) mode to analog bypass mode. The pulse skip detector circuit 250 does this by determining when to increase or decrease the current that is provided by the current source 190. As the circuit operation approaches drop out, the Pull Up DAC will transition from a current DAC output to a resistive DAC output. For example, in the case where a PMOS output transistor is used on the output of the DAC, the operation of the transistor would move from saturation mode to linear mode. The pulse skip detector circuit 250 operates by sampling the switch node pulse width modulated signal.

As shown in FIG. 2, the pulse skip detector circuit 250 receives a pulse width modulated (PWM) clock signal (designated CLK) from the switcher circuit 120. The pulse skip detector circuit 250 also receives the switch node pulse width modulated signal (designated VSW) from the switcher circuit 120. The VSW signal represents the digital state of the switch output pin SW.

The output of the pulse skip detector circuit 250 is provided to the combination logic and state machine 270. The pulse skip detector circuit 250 outputs an N+1 bit digital word (designated PSD<N:0>) that indicates whether the buck regulator circuit 100 is skipping pulses and that indicates whether the ACB control circuit 180 should change the value of the current from current source 190. The N+1 bit digital word PSD<N:0> provides the drop out information (Drop Out) shown in FIG. 1.

A first portion of the pulse skip detection information in the PSD digital word comprises a "Down Disable" digital signal (designated DwnDis) that also goes high when more than one (1) pulse is skipped. The DwnDis signal overrides the "active current" (AC) portion from decrementing the ACB counter for bypass mode.

A second portion of the pulse skip detection information in the PSD digital word comprises a "Pulse Skip Detect Up Count" digital signal (designated PSDUp) that goes high when more than six (6) pulses are skipped. The PSDUp is a pulsed signal that increments the counter/Pull Up DAC pushing the system further into bypass mode.

A third portion of the pulse skip detection information in the PSD digital word comprises a "Full Bypass Mode" digital signal (designated FulBP) that also goes high when more than six (6) pulses are skipped. The FulBP signal is not a pulsed signal. The FulBP signal stays high until six (6) or fewer pulse skips are detected. In full bypass mode the ACB output current limit changes from one and six tenths amperes (1.6 A) to three and two tenths amperes (3.2 A).

The number of pulses skipped and the current limits described above are provided as examples. The actual values will depend on a particular application.

The voltage error comparator circuit 260 is a digital circuit that compares a representation of the output voltage of the buck regulator circuit 100 with reference offset voltages. The voltage error comparator circuit 260 receives a feed back voltage (designated FB in FIG. 2). The feed back voltage FB is a representation of the output voltage that is normally fed back to the error amplifier of the buck regulator circuit 100 for regulation. The feed back voltage FB is fed to the voltage error comparator circuit 260 to provide a digital output that indicates how far the buck regulator circuit 100 is out of regulation.

The voltage error comparator circuit 260 receives the voltage error information from the switcher circuit 120. The voltage error information comprises a series of positive and negative reference voltage offsets (designated VREF in FIG. 2) that are to be compared to the feed back voltage FB of the buck regulator circuit 100. The voltage error comparator circuit 260 makes the comparisons.

The output of the voltage error comparator circuit 260 is provided to the combination logic and state machine 270. The voltage error comparator circuit 2650 outputs an P+1 bit digital word (designated Verr<P:0>) that indicates how far the buck regulator circuit 100 is out of regulation.

A first portion of the voltage error information in the Verr digital word comprises a digital signal (designated EALP) that goes high when the voltage error amplitude is large and positive. The letters EALP stand for Error Amplitude Large and Positive. The EALP signal goes high when two and one half (2.5) times the VCON voltage is greater than the sum of the feed back voltage FB plus three hundred millivolts (300 mV).

A second portion of the voltage error information in the Verr digital word comprises a digital signal (designated EASP) that goes high when the voltage error amplitude is small and positive. The letters EASP stand for Error Amplitude Small and Positive. The EASP signal goes high when two and one half (2.5) times the VCON voltage is greater than the sum of the feed back voltage FB plus seventy five millivolts (75 mV).

A third portion of the voltage error information in the Verr digital word comprises a digital signal (designated EASN) that goes high when the voltage error amplitude is small and negative. The letters EANP stand for Error Amplitude Small and Negative. The EANP signal goes high when two and one half (2.5) times the VCON voltage is less than the sum of the feed back voltage FB minus seventy five millivolts (75 mV).

A fourth portion of the voltage error information in the Verr digital word comprises a digital signal (designated EALN) that goes high when the voltage error amplitude is large and negative. The letters EALN stand for Error Amplitude Large and Negative. The EALN signal goes high when two and one half (2.5) times the VCON voltage is less than the sum of the feed back voltage FB minus three hundred millivolts (300 mV).

The voltage error comparator circuit 260 provides voltage error information for selecting a current step size for the combination logic and state machine 270 to use in adjusting the value of the current step size from current source 190.

The voltage error settings and detection points (and their values) that are described above are given as examples. Each particular application will require different specific values to optimize the operation of the application.

The combination logic and state machine 270 receives (1) the current limit information IC<M:0> from the current comparator circuit 240, and (2) the drop out information PSD<N:0> from the pulse skip detector circuit 250, and (3) the voltage error information Verr<P:0> from the voltage error comparator circuit 260. The combination logic and state machine 270 also receives the pulse width modulated (PWM) clock signal CLK.

The combination logic and state machine 270 implements an ACB logic that uses the information (described above) that is received from the buck regulation circuit 100 to control the amount of "assist" current that is provided by the current source 190. The ACB logic keeps track of when the ACB control circuit 180 should transition from pull up current to pull down current (and vice versa). The ACB logic also determines whether minor correction or major correction is needed. By monitoring the voltage error the ACB logic also makes sure that count changes in the wrong direction are avoided. The ACB logic also determines when the ACB control circuit 180 is to operate in a current "assist" mode and when the ACB control circuit 180 is to operate in a bypass mode via Pulse Skip Detector control signals.

As shown in FIG. 2, the combination logic and state machine 270 provides the polarity enable signals to the pull up DAC 210 and to the pull down DAC 220. As previously described, the polarity enable signals select either the pull up DAC 210 or the pull down DAC 220 for operation.

The combination logic and state machine 270 provides a plurality of digital control signals to the variable bit up/down counter 280. The "Set" control signal causes the counter 280 to set the count to the maximum value. The "UpMax" control signal causes the counter 280 to make a maximum up count step size for a fast response time. The "UpMed" control signal causes the counter 280 to make a medium up count step size for moderate corrections. The "UpMin" control signal causes the counter 280 to make a minimum up count step size for minor corrections. In this advantageous embodiment, four (4) up count step sizes have been described (Set, Maximum Up, Medium Up, Minimum Up). Any number of up count step sizes may be used. The four (4) up count step sizes that have been described are merely one example.

The combination logic and state machine 270 can also send a reset control signal (designated Rst) to the counter 280. The reset control signal forces the counter to reset 280. Resetting the counter 280 causes the ACB control circuit 180 to turn off. The "DwnMax" control signal causes the counter 280 to make a maximum down count step size for a fast response time. The "DwnMed" control signal causes the counter 280 to make a medium down count step size for moderate corrections. The "DwnMin" control signal causes the counter 280 to make a minimum down count step size for minor corrections. In this advantageous embodiment, four (4) down count step sizes have been described (Reset, Maximum Down, Medium Down, Minimum Down). Any number of down count step sizes may be used. The four (4) down count step sizes that have been described are merely one example.

The counter 280 sends a Zero Count control signal (designated ZeroCnt) to the combination logic and state machine 270 to indicate when the count is approaching zero. This enables the combination logic and state machine 270 to change the polarity if a polarity change is needed.

As shown in FIG. 2, the counter 280 also receives the pulse width modulated (PWM) clock signal CLK. The counter 280 outputs the count in a digital control signal to the pull up DAC 210 and to the pull down DAC 220. The count tells the pull up DAC 210 and the pull down DAC 220 what level of current is needed.

The counter 280 is a synchronous counter that is able to operate with dynamically changing up step sizes and with dynamically changing down step sizes. The counter 280 is also responsive to the "set" control signal and the "reset" control signal. This allows the counter 280 to make (1) large step sizes for fast ACB responses whenever a large buck signal perturbation occurs and (2) small step sizes when the buck regulator circuit 100 is near steady state operation. In this manner fast ACB responses can be made when needed without sacrificing stable operation when only small corrections are needed.

Figure 3:
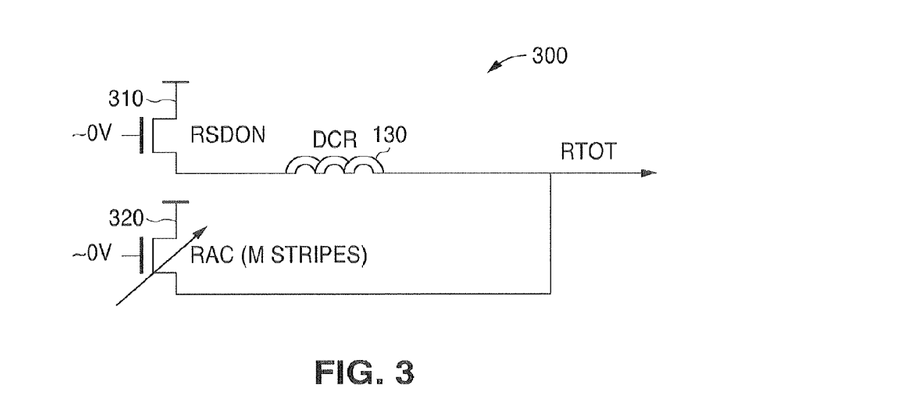
FIG. 3 illustrates a schematic diagram showing a circuit representation that illustrates a calculation of the drop out resistance of the switcher and the active current assist analog bypass control circuit of the present invention.

FIG. 3 illustrates a schematic diagram showing a circuit representation 300 that illustrates a calculation of the drop out resistance of the switcher 120 and the active current assist analog bypass control circuit 180 of the present invention. The circuit representation 300 represents an operation in which the ACB control circuit 180 is in full bypass mode (maximum count value). That is, the ACB control circuit 180 is turned full on. The buck regulator circuit 100 is represented by a PMOS transistor 310. The ACB control circuit 180 is represented by a variable PMOS transistor 320. As shown in FIG. 3, the output of the PMOS transistor 310 is connected to the inductor 130. The output of the variable PMOS transistor 320 is connected in parallel with the inductor 130.

A typical value of the RDSON resistance of the PMOS transistor 320 is two hundred milliohms (200 mOhms). A typical value of the DCR resistance of the inductor 130 is one hundred milliohms (100 mOhms). A typical minimum resistance of the variable PMOS resistor 320 (designated RAC) is fifty milliohms (50 mOhms). The total output resistance is designated RTOT. The output resistance RTOT can be calculated as follows:

$$RTOT=(RSDON+DCR)\|RAC$$

If RDSON equals 200 mOhms, and DCR equals 100 mOhms, and RAC equals 50 mOhms, then the value of RTOT is forty three milliOhms (43 mOhms). This is the drop out resistance for the buck regulator circuit 100 and the ACB control circuit 180 in parallel when the ACB control circuit 180 is in the analog bypass mode. A typical drop out resistance for the buck regulator circuit 100 without the ACB control circuit 180 in parallel is three hundred milliohms (300 mOhms).

Figure 4:
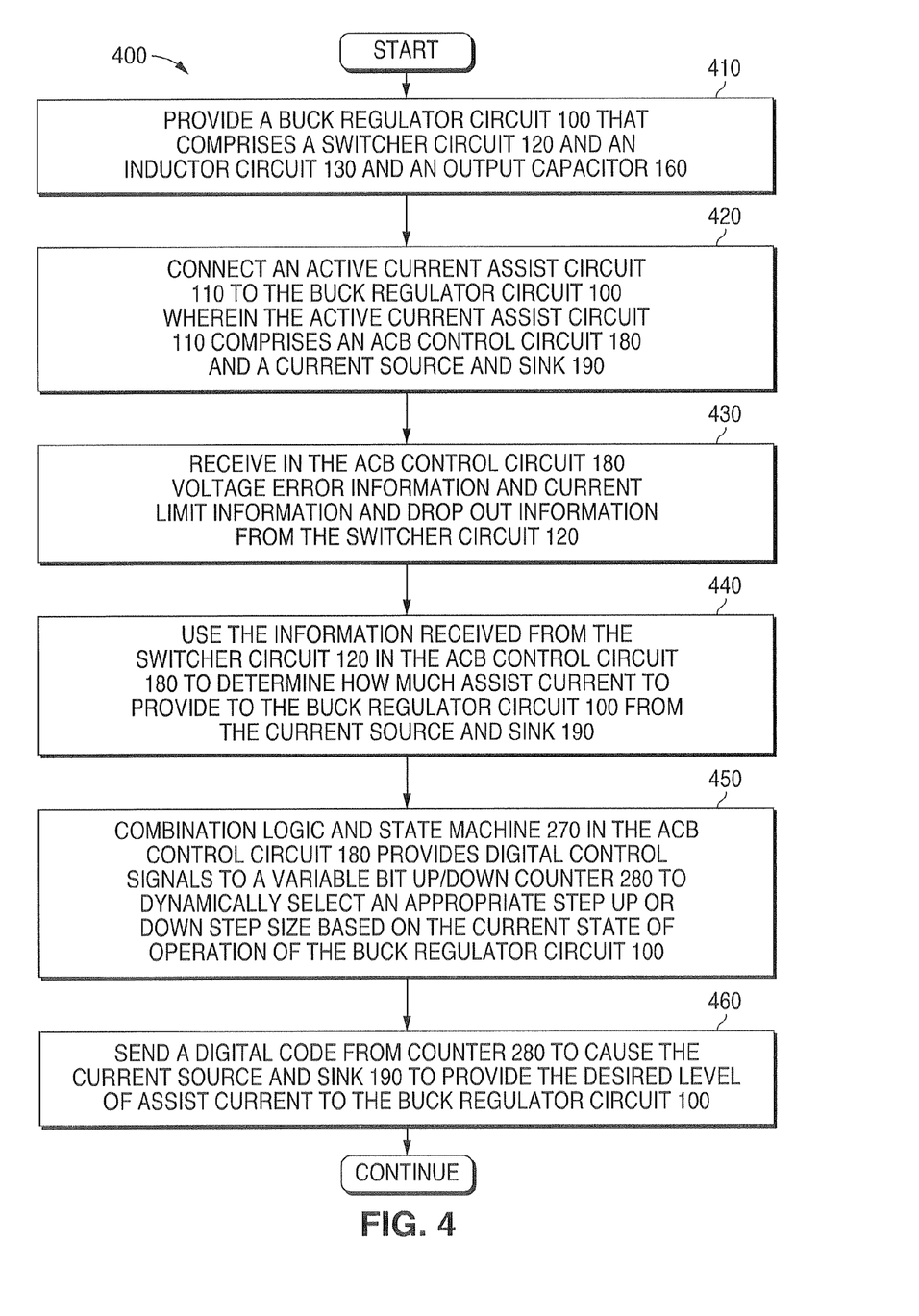
FIG. 4 illustrates a flow chart showing the steps of an advantageous embodiment of the method of the present invention.

FIG. 4 illustrates a flow chart showing the steps of an advantageous embodiment of the method of the present invention. First a buck regulator circuit 100 is provided that comprises a switcher circuit 120, an inductor circuit 130 and an output capacitor 160 (step 410). Then an active current assist circuit 110 of the present invention is connected to the buck regulator circuit. The active current assist circuit 110 comprises an ACB control circuit 180 and a current source 190 and sink (step 420).

Then the ACB control circuit 180 receives (1) voltage error information, and (2) inductor current information, and (3) drop out information from the switcher circuit 120 (step 430). Then the information received from the switcher circuit 120 is used in the ACB control circuit 180 to determine how much assist current to provide to the buck regulator circuit 100 from the current source and sink 190 (step 440).

In the ACB control circuit 180 a combination logic and state machine 270 provides digital control signals to a variable bit up/down counter 280 to dynamically select an appropriate step up or step down size based on the current state of operation of the buck regulator circuit 100 (step 450). Then the counter 280 sends a digital code to cause the current source and sink 190 to provide the desired level of assist current to the buck regulator circuit 100 (step 460).

It may be advantageous to set forth definitions of certain words and phrases that have been used within this patent document. The term "couple" and its derivatives refer to any direct or indirect communication between two or more components, whether or not those components are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The term "each" means every one of at least a subset of the identified items. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. For example, ACB is not limited to just magnetic bucks. ACB can also be applied to switched capacitor power devices. The elements of the invention can also be employed separately as Active Current assist only, bypass only, or Active Current assist with bypass (described above). In addition, the negative current source is optional depending upon the need of a particular application to quickly discharge the output capacitor.

Accordingly, the above description of example embodiments does not define or constrain this disclosure. Other changes, substitutions, and alterations are also possible without departing from the spirit and scope of this disclosure, as defined by the following claims.

What is claimed is:

1. A buck regulator circuit for providing buck regulation to supply a regulated load current to a load, the buck regulator circuit operable with a buck inductor coupled to the buck regulator at a switch node and to the load at an output node, the buck regulator circuit comprising:
   a switcher circuit operable to provide buck regulation and supply an inductor current through the buck inductor to the load; and
   an analog bypass (ACB) circuit including:
      an ACB current source coupled to the output node and in parallel with the buck inductor, and configured to supply, in response to an ACB control signal, an ACB current to the load; and
      an ACB control circuit configured to provide the ACB control signal;
   wherein the switcher circuit and the buck inductor are characterized by a switcher/inductor drop out resistance, and the ACB current source is characterized by an ACB resistance, such that a regulator drop out resistance at the output node corresponds to the switcher/inductor drop out resistance in parallel with the ACB resistance, which is less than the switcher/inductor drop out resistance; and
   wherein the ACB control circuit includes:
      a current comparator circuit configured to receive inductor current information from the switcher circuit, and to provide an inductor current signal representative of the inductor current relative to a predetermined current limit of the inductor; and a drop out detector circuit configured to receive drop out information from the switcher circuit, and to provide a drop out signal representative of buck regulation operation of the switcher circuit relative to a predetermined drop out condition in which the switcher substantially ceases regulation;

wherein the ACB control circuit is operable to provide the ACB control signal based on the inductor current signal and the drop out signal.

2. The buck regulator circuit as set forth in claim 1:

wherein the ACB current source comprises series coupled pull-up and pull-down digital to analog converters (DACs) responsive to polarity select signals to selectively enable either the pull-up DAC to source the ACB current to the output node, or the pull-down DAC to sink the ACB current from the output node; and wherein the ACB control circuit includes:

a combination logic and state machine coupled to the current comparator circuit and the drop out detector circuit, the combination logic and state machine configured to provide, in response to the inductor current signal and the drop out signal, (i) a variable multi-bit control value, and (ii) the polarity select signals; and a DAC count circuit configured to provide, in response to the variable multi-bit count value, the ACB control signal to control the pull-up and pull-down DACs.

3. The buck regulator circuit as set forth in claim 1:

further comprising an output capacitor coupled to the output node in parallel with the load;

wherein the ACB current source comprises a positive ACB current source to source the ACB current and a negative ACB current source to sink the ACB current; and wherein the ACB control circuit is operable to control the ACB current to charge and discharge the output capacitor.

4. The buck regulator circuit as set forth in claim 1, wherein the current comparator circuit is operable to compare the inductor current information from the switcher circuit to a current limit reference representative of inductor saturation.

5. The buck regulator circuit as set forth in claim 1, wherein the drop out detector comprises at least one of a pulse skip detector circuit configured to receive pulse skip information from the switcher circuit corresponding to a predetermined pulse skip condition; and a voltage error comparator circuit configured to receive output voltage information from the switcher circuit corresponding to a predetermined buck regulation condition.

6. The buck regulator circuit as set forth in claim 5, wherein the output voltage information from the switcher circuit comprises a feedback voltage that is a representation of an output voltage at the output node that is fed back to the switcher circuit for buck regulation.

7. The buck regulator circuit as set forth in claim 5, wherein the pulse skip information from the switcher circuit is derived from a pulse width modulated signal output by the switcher circuit at the switch node.

8. The buck regulator circuit as set forth in claim 7, wherein the pulse skip information corresponds to a number of pulses skipped by the switcher circuit.

9. The buck regulator circuit as set forth in claim 1, wherein the ACB control circuit is operable to supply, in response to at least the inductor current signal, ACB current to the output node such that the dynamic range of the buck regulator is greater that the dynamic range of the switcher circuit.

10. The buck regulator circuit as set forth in claim 1, wherein the ACB control circuit is operable to provide the ACB control signal to control both the amount and the rate of change of the ACB current supplied to the load.

11. The buck regulator circuit as set forth in claim 10, wherein the ACB control circuit is operable to provide the ACB control signal with a dead band in which the ACB current does not change in response to inductor current signal and the drop out signal.

12. A buck regulator circuit for providing buck regulation to supply a regulated load current to a load, the buck regulator circuit operable with a buck inductor coupled to the buck regulator at a switch node and to the load at an output node, the buck regulator circuit comprising:

a switcher circuit operable to provide buck regulation and supply an inductor current through the buck inductor to the load; and an analog bypass (ACB) circuit including:

an ACB current source coupled to the output node and in parallel with the buck inductor, and configured to supply, in response to an ACB control signal, an ACB current to the load;

wherein the ACB current source includes series coupled pull-up and pull-down digital to analog converters (DACs) responsive to polarity select signals to selectively enable either the pull-up DAC to source the ACB current to the output node, or the pull-down DAC to sink the ACB current from the output node; and an ACB control circuit configured to provide the ACB control signal;

wherein the switcher circuit and the buck inductor are characterized by a switcher/inductor drop out resistance, and the ACB current source is characterized by an ACB resistance, such that a regulator drop out resistance at the output node corresponds to the switcher/inductor drop out resistance in parallel with the ACB resistance, which is less than the switcher/inductor drop out resistance; and wherein the ACB control circuit includes:

a current comparator circuit configured to receive inductor current information from the switcher circuit, and to provide an inductor current signal representative of the inductor current relative to a predetermined current limit of the inductor;

a drop out detector circuit configured to receive drop out information from the switcher circuit, and to provide a drop out signal representative of buck regulation operation of the switcher circuit relative to a predetermined drop out condition in which the switcher substantially ceases regulation;

a combination logic and state machine configured to provide, in response to the inductor current signal and the drop out signal, (i) a variable multi-bit control value, and (ii) the polarity select signals; and a DAC count circuit configured to provide, in response to the variable multi-bit count value, the ACB control signal to control the pull-up and pull-down DACs.

13. The buck regulator circuit as set forth in claim 12:

further comprising an output capacitor coupled to the output node in parallel with the load;

wherein the ACB control circuit is operable to control the ACB current to charge and discharge the output capacitor.

14. The buck regulator circuit as set forth in claim 12, wherein the current comparator circuit is operable to compare the inductor current information from the switcher circuit to a current limit reference representative of inductor saturation.

15. The buck regulator circuit as set forth in claim 12, wherein the drop out detector comprises at least one of:
- a pulse skip detector circuit configured to receive pulse skip information from the switcher circuit corresponding to a predetermined pulse skip condition; and
- a voltage error comparator circuit configured to receive output voltage information from the switcher circuit corresponding to a predetermined buck regulation condition.

16. The buck regulator circuit as set forth in claim 15, wherein the output voltage information from the switcher circuit comprises a feedback voltage representative of an output voltage at the output node that is fed back to the switcher circuit for buck regulation.

17. The buck regulator circuit as set forth in claim 15, wherein the pulse skip information from the switcher circuit is derived from a pulse width modulated signal output by the switcher circuit at the switch node.

18. The buck regulator circuit as set forth in claim 17, wherein the pulse skip information corresponds to a number of pulses skipped by the switcher circuit.

19. The buck regulator circuit as set forth in claim 12, wherein the ACB control circuit is operable to supply, in response to at least the inductor current signal, ACB current to the output node such that the dynamic range of the buck regulator is greater that the dynamic range of the switcher circuit.

20. The buck regulator circuit as set forth in claim 12, wherein the ACB control circuit is operable to provide the ACB control signal to control both the amount and the rate of change of the ACB current supplied to the load.

21. The buck regulator circuit as set forth in claim 20, wherein the ACB control circuit is operable to provide the ACB control signal with a dead band in which the ACB current does not change.

22. A method of buck regulation to supply a regulated load current to a load through a buck inductor that is coupled to a buck regulator at a switch node and to the load at an output node, the method of buck regulation comprising:
- operating the buck regulator to supply an inductor current through the buck inductor to the load; and
- controlling an ACB current source coupled to the output node in parallel with the buck inductor to supply at the output node an ACB current to the load;
- wherein the buck regulator and the buck inductor are characterized by a switcher/inductor drop out resistance, and the ACB current source is characterized by an ACB resistance, such that a regulator drop out resistance at the output node corresponds to the switcher/inductor drop out resistance in parallel with the ACB resistance, which is less than the switcher/inductor drop out resistance; and
- providing an ACB control signal to control the ACB current source by:
  - providing, in response to inductor current information, an inductor current signal representative of the inductor current relative to a predetermined current limit of the inductor; and
  - providing, in response to drop out information, a drop out signal representative of buck regulation relative to a predetermined drop out condition in which buck regulation substantially ceases;
  - providing the ACB control signal based on the inductor current signal and the drop out signal.

23. The method of claim 22, wherein an output capacitor is coupled to the output node in parallel with the load, and wherein the ACB current is controlled to charge and discharge the output capacitor.

24. The method of claim 22, wherein the inductor current information comprises a current limit reference representative of inductor saturation.

25. The method of claim 22, wherein the drop out information comprises at least one of:
- pulse skip information corresponding to a predetermined pulse skip condition; and
- output voltage information corresponding to a predetermined buck regulation condition.

26. The method of claim 22, wherein the ACB current is supplied to the output node such that the dynamic range for the regulated load current is greater that the dynamic range of the buck regulator.

27. The method of claim 22, wherein the ACB control signal controls both the amount and the rate of change of the ACB current supplied to the load.

28. The method of claim 27, wherein the ACB control signal includes a dead band in which the ACB current does not change.

* * * * *